(12) United States Patent  
Beauchemin (10) Patent No.: US 8,917,320 B2  
(45) Date of Patent: Dec. 23, 2014

(54) DIGITAL OPTICAL COMPARATOR

(75) Inventor: Patrick Beauchemin, Point-Claire (CA)

(73) Assignee: VISIONx Inc., Quebec (CA)

( * ) Notice: Subject to any disclaimer, the term of this patent is extended or adjusted under 35 U.S.C. 154(b) by 1072 days.

(21) Appl. No.: 12/398,127

(22) Filed: Mar. 4, 2009

(65) Prior Publication Data

US 2010/0225666 A1    Sep. 9, 2010

(51) Int. Cl.
*H04N 7/18* (2006.01)
*G06K 9/00* (2006.01)
*G06T 7/00* (2006.01)

(52) U.S. Cl.
CPC ............ *G06K 9/00476* (2013.01); *G06T 7/001* (2013.01); *G06K 2209/19* (2013.01)
USPC .............................................. 348/92; 348/90

(58) Field of Classification Search
None
See application file for complete search history.

(56) References Cited

U.S. PATENT DOCUMENTS

| | | | |
|---|---|---|---|
| 4,139,304 A * | 2/1979 | Redman et al. ............. | 356/511 |
| 4,167,066 A | 9/1979 | Cooper et al. | |
| 4,823,396 A | 4/1989 | Thompson | |
| 4,866,990 A | 9/1989 | Peterson et al. | |
| 5,150,623 A | 9/1992 | Woods | |
| 5,440,396 A | 8/1995 | Markus et al. | |
| 5,936,311 A * | 8/1999 | Watrobski et al. ............ | 257/797 |
| 6,055,329 A | 4/2000 | Mufti | |
| 6,111,601 A | 8/2000 | Adachi | |
| 6,169,840 B1 | 1/2001 | Lemelson | |
| 6,301,007 B1 | 10/2001 | Hanlon et al. | |
| 6,452,677 B1 | 9/2002 | Do et al. | |
| 6,882,745 B2 | 4/2005 | Brankner et al. | |
| 7,134,210 B2 | 11/2006 | Yeeles | |
| 7,365,862 B2 | 4/2008 | Hu et al. | |
| 7,665,843 B2 * | 2/2010 | Xie ................ | 351/200 |
| 2001/0012395 A1 | 8/2001 | Michael et al. | |
| 2002/0057339 A1 * | 5/2002 | Shoenfeld ........... | 348/86 |
| 2002/0128790 A1 | 9/2002 | Woodmansee | |
| 2003/0174877 A1 * | 9/2003 | Aiger ................. | 382/145 |
| 2004/0066457 A1 * | 4/2004 | Silverstein et al. ....... | 348/211.3 |
| 2005/0111726 A1 | 5/2005 | Hackney et al. | |
| 2005/0147289 A1 | 7/2005 | Kodama et al. | |
| 2006/0056732 A1 | 3/2006 | Holmes | |
| 2006/0245636 A1 | 11/2006 | Kitamura et al. | |
| 2007/0109558 A1 | 5/2007 | Harding et al. | |
| 2009/0248323 A1 * | 10/2009 | Turner et al. ............. | 702/39 |
| 2009/0317785 A2 * | 12/2009 | Hoffmann ............. | 434/323 |
| 2010/0014747 A1 * | 1/2010 | Freifeld ............... | 382/141 |
| 2010/0253863 A1 * | 10/2010 | Harding et al. ............ | 348/750 |

FOREIGN PATENT DOCUMENTS

| | | |
|---|---|---|
| CA | 2106146 A1 | 4/1994 |
| EP | 0930499 A1 | 7/1999 |

OTHER PUBLICATIONS

International Search Report (ISR) for related International Application No. PCT/CA10/00295.

* cited by examiner

*Primary Examiner* — Thanh Tammy Nguyen
*Assistant Examiner* — Keyvan Emdadi
(74) *Attorney, Agent, or Firm* — Baker Hostetler LLP (57) ABSTRACT

A digital optical comparator has a holder for a part under study. A light source illuminates the part and casts an image of the part onto a camera, which is provided with a lens. The image captured by the camera is displayed on a screen, and a drawing of the part is overlaid on the image of the part. Thus, defects in manufacturing can be easily and readily identified. In addition, a determination of whether the part is manufactured within tolerances can also be visually determined.

16 Claims, 4 Drawing Sheets

DIGITAL OPTICAL COMPARATOR

FIELD OF THE INVENTION

The present invention relates to a digital optical comparator.

DESCRIPTION OF THE PRIOR ART

An optical comparator (often simply called a comparator, or a profile projector or a contour projector) is a device that applies the principles of optics to the inspection of manufactured parts. In a comparator, the magnified part is projected on a screen, and the dimensions and geometry of the part are measured against prescribed limits.

Prior art comparators rely heavily on the skill of the operator to properly align the part and the reference template for comparison purposes. Additionally, prior art comparators do not provide a straightforward means for orienting the part and the reference template once the part is installed in the comparator.

Some of the prior art comparators consist of a light source, a support for the part, and optics for capturing the image of the part and displaying the same on a display. The display usually displays a zoomed in image of the part. In these comparators, a transparency of the drawing of the part, or a blueprint, or some other printed/drawn image is actually taped to the screen of the comparator in the proper orientation in order to compare the part with the drawing. It will be appreciated that this is quite intensive on the part of the operator. Not only must the drawing be to the correct scale, as must be the image of the part on the screen, it is delicate to properly overly the paper/printed drawing over the screen in order to compare the part to the drawing.

SUMMARY OF THE INVENTION

It is an object of the present invention to provide a digital optical comparator which overcomes the deficiencies of the prior art.

Thus, in accordance with one aspect of the invention, there is provided a digital comparator comprising:
 a holder for holding a part;
 a light source for illuminating the part;
 a camera for capturing an image of the illuminated part and a lens placed in front of said camera; and
 a data processing system for receiving the image, for obtaining a CAD drawing of said part, for displaying said image and said drawing on a computer screen, where said drawing is digitally overlaid on said image, said data processing system further including means for aligning said drawing with said image.

In accordance with another aspect of the invention, there is provided a digital optical comparator comprising a method for permitting comparison between a part under study and a reference drawing, said part having been manufactured to specifications contained in said drawing, said method comprising the steps of:
 (a) placing said part on a support;
 (b) illuminating said part;
 (c) capturing an image of said part with a camera, said camera being provided with a lens; and
 (d) overlaying said drawing and said image of said part on a display.

DESCRIPTION OF THE FIGURES

The present invention will be better understood after having read a description of a preferred embodiment thereof made in reference to the following drawings in which.

DESCRIPTION OF A PREFERRED EMBODIMENT OF THE INVENTION

General Description

The present invention concerns a digital optical comparator system, which will, for ease of reference, be hereinafter referred to as "DOC". The DOC of the present invention is a computerized optical instrument that allows the user to compare a digital live video image of a part with its CAD drawing, without any restriction regarding the part's size, and in real-time (i.e. at the camera's full frame rate).

The DOC captures a very high-resolution, digital live video image of a part and in real-time carries out image correction operations to remove any distortion introduced by the system's lens and correct for any defective pixels in the image.

Following these image correction operations, the DOC produces a geometrically correct, high-quality image of the part (i.e. un-distorted and without point defects), for both big and small parts.

Still in real-time, the DOC:
 carries out any required image processing operations on the "corrected" image (for example: image enhancement, uneven illumination correction, noise removal, color correction, etc. ... )
 superimposes the part's CAD drawing onto the "corrected" and "enhanced" image.

The DOC allows the user to move the CAD drawing on screen (X-Y translation & rotation) using either an external device (such as a joystick with X-Y-Theta controls, for example) or equivalent on-screen controls for X-Y translation & rotation. This allows the user to quickly and easily line up the part and its drawing, without having to move the part.

Using pattern matching software tools, the DOC can also carry out this alignment operation automatically.

Finally, the DOC displays, at the camera's full frame rate, the resulting "corrected" and "enhanced" high-resolution video image, with the superimposed properly scaled and aligned CAD information, in full resolution on at least one computer monitor.

With the DOC, if the part matches its CAD drawing exactly, then the part's image and the CAD drawing line up perfectly. If there are any discrepancies between the part and its CAD drawing these discrepancies will be readily visible on-screen.

The DOC also allows the operator to measure various dimensions on-screen, including the size of any such discrepancies.

Using edge-detection based measurement tools, the DOC can also automatically verify that the part is within tolerance at various user-specified control positions.

It will be appreciated that the DOC can also include a stage, either manual or motorized, to move the part in front of the camera. When the stage is encoded the DOC is able to carry out measurements beyond the optical field of view (by relating the stage displacements and the on-screen position of features between measurement points).

It will further be appreciated that the DOC can call-up a part's drawing simply by either scanning in a barcode (which might correspond to a work order, for example) or by manually typing in the barcode information (in our example: typing-in the work order number).

Note also that the DOC has the ability to recall a previously-displayed CAD drawing (as well as the position and orientation at which it was displayed) by clicking on a single on-screen button.

The DOC consists of:

A lens 11

A digital camera 13

A computer, or other appropriate data processing system, 15 running the appropriate hardware and software to interface with the camera One or more monitors 17. A preferred implementation provides for multiple monitors which allows the high-resolution image produced by the camera to be displayed fully (i.e. in 1:1 resolution on the bank of monitors, so that every pixel coming from the camera corresponds to a pixel on the bank of monitors, and allows for room for other windows).

Illumination means 19 (either transmitted and/or reflected, for back- and/or front-illumination, respectively). A preferred implementation of the DOC provides that the illumination is programmable and computer-controlled, which allows for repeatable illumination conditions. The reader will appreciated that programmable, computer-controlled illumination requires that appropriate interface and control hardware be present.

Means 21 for mounting the camera, lens and illumination, such as brackets, hardware and structural elements. The reader will appreciate that the camera, lens and illumination means can be mounted either vertically, horizontally or at any other arbitrary orientation.

Means 23 for mounting the part 20 between the camera and the lens.

Adapted software running on the computer.

Implementation and Operation

Image Capture

The DOC's illumination, lens and camera produce a stream of very high resolution digital images (also known as live video) of a part. This is a difference from some prior art systems in that a "snapshot" or still image of the part is captured. In the present invention, streaming data is obtained, so that a more dynamic comparison of the part can be made.

A preferred implementation uses a telecentric lens and includes programmable, computer-controlled illumination (for repeatable illumination conditions).

Image Correction

The DOC carries out real-time image correction operations of this image stream.

Figure 6:
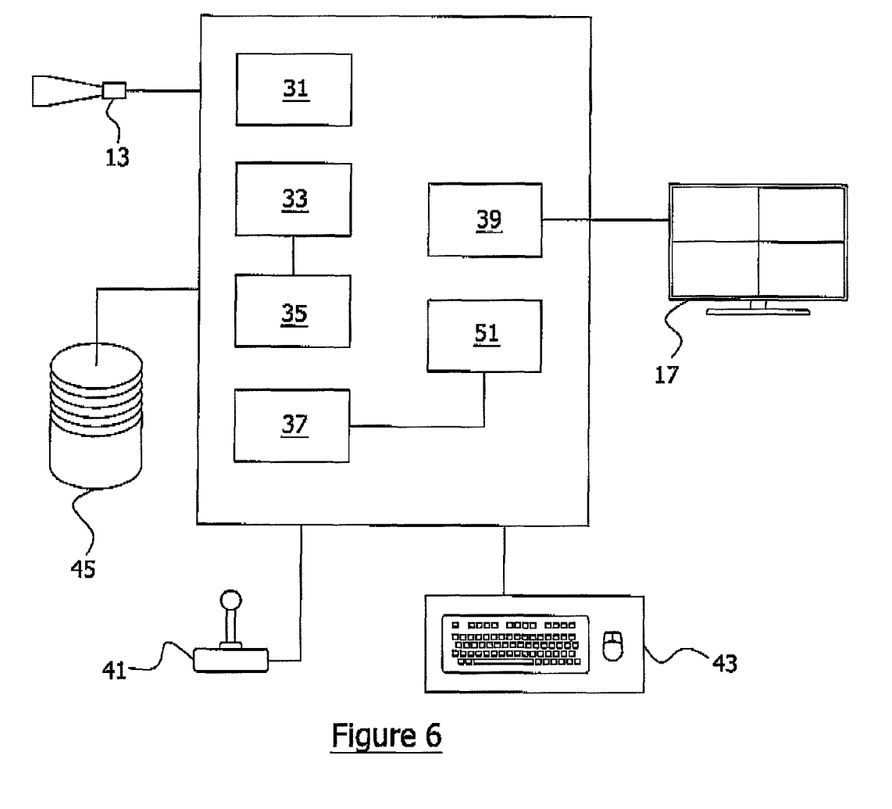
FIG. 6 is a schematic representation of a data processing system for the digital optical comparator system.

In a preferred implementation, automatic image correction 31 is carried out to obtain a geometrically correct image of the part (i.e. an image in which all of the pixels correspond to the same real-world dimensions). The DOC's automated distortion correction subsystem is described in detail below.

This scheme corrects errors introduced by the DOC's lens. Without any such correction, the image would not be geometrically true to the part (i.e. certain portions would appear larger than they should and others smaller). This is especially true for larger field of views where all optical lenses distort the image that they produce, to a greater or lesser degree.

The DOC also corrects for defects in the image introduced by the camera. Our preferred implementation corrects the image for defective pixels, also referred to as dead pixels. The DOC's automated defective pixel correction scheme is described further.

A preferred implementation of the invention uses a camera with a very high resolution sensor and these sensors are precisely the ones in which defective pixels are more common. The DOC automatically identifies defective pixels and corrects the image to remove their effect.

The image correction allows the DOC to produce a geometrically correct, high-quality image of the part (i.e. undistorted and without point defects), for both big and small parts.

Image Enhancement

Following the image correction schemes, the DOC also carries out real-time image enhancement 33 on each image in the live video stream.

In a preferred implementation of the DOC, some of the image enhancement operations that are available include, without limitation: noise removal, uneven illumination correction, edge sharpening and color correction.

CAD File Comparison

The DOC can be used to read in a CAD file containing the mathematical definition of the part. The preferred implementation includes a CAD package 37 which reads in DXF format CAD files from a database 45 or other repository, but other CAD file formats (such as DWG) are also within the scope of the present invention.

The DOC can automatically scale the contents of the CAD file to match up with the system's optical magnification.

The appropriately scaled CAD data can then be superimposed onto the stream of (corrected and enhanced) live video images Manual Alignment of the CAD Data and the Part The DOC allows the user to manually align the CAD drawing with the image of the part.

The DOC allows the user to move the CAD drawing on screen (X-Y translation and rotation) using either an external device (such as a joystick 41 with X-Y-Theta controls, for example) or equivalent on-screen controls for X-Y translation and rotation, for example with a keyboard and mouse 43, or even by using trackballs or touch-screens. This allows the user to quickly and easily line up the part and its drawing, without having to move the part.

Automated Alignment of the CAD Data and the Part

Using pattern matching software tools 39, the DOC can also carry out this alignment operation automatically.

A preferred implementation uses the following approach: the first time that a CAD file is read into the system (we will say that the system is then in "teach" mode), the user aligns the part's drawing manually with the displayed image of the part. The system then remembers this position and orientation. We will call the position and orientation of the part in "teach" mode the nominal position and orientation.

Then, the next time that the drawing is read-in to the system, a pattern matching tool can be used to find the part's position and orientation. The rotation and translation difference between this position and the nominal position can then be applied to the CAD data. This way, the CAD drawing always "follows the part".

A further refinement is also possible. The position and orientation found using the approach described above is used as a starting position for a "fine search". This "fine" search uses a certain number of "control points" spread reasonably uniformly throughout the CAD drawing. A software edge detection tool then finds the edge point closest to each of these "control points". Keeping constant the distance between all of the various edge points (i.e. "rigid body motion"), the DOC attempts to carry out fine translation and rotation adjustments to the drawing's position and orientation so as to minimize the square root of the sum of the squared distance between each of the control point and its nearest edge (i.e. "least squares" approach).

Image Display

The resulting stream of images (with the superimposed CAD data, properly scaled and aligned) can be displayed on-screen in real time by the computer, at the camera's full frame rate.

In the preferred implementation, the image stream is displayed onto multiple monitors, in full 1:1 resolution (i.e. every pixel in the image is displayed using one pixel in the "monitor array").

With the DOC, if the part matches its CAD drawing exactly then the part's image and the CAD drawing line up perfectly on-screen. On the other hand, if there are any discrepancies between the part and its CAD drawing then these non-conformities will be readily visible on-screen.

Measurements

The DOC also allows the operator to measure various dimensions, by simply selecting measurement points on-screen with the mouse, including the size of any such discrepancies. The coordinates are provided by and interpreted with a measurement package 51.

The DOC allows the user to carry out simple point-to-point measurements, as well as many other types of measurements: angle, diameter, radius, etc. . . . Measurements to and from elaborate geometric constructs, such as from the center of a circle, the point of intersection of two lines, etc, are also possible.

Using edge-detection based measurement tools, the DOC can also automatically verify that the part is within tolerance at various user-specified control positions.

Stage Interface

Figure 1:
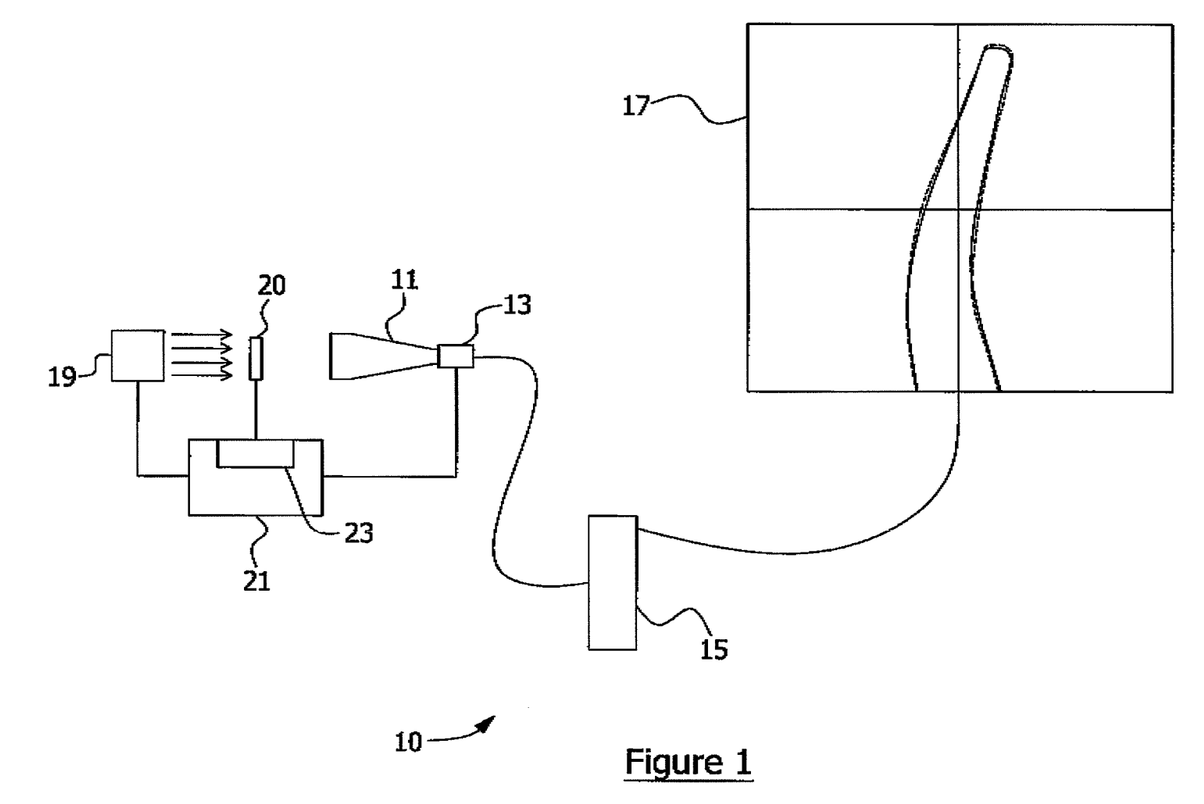
FIG. 1 is a schematic representation of a digital optical comparator system according to a preferred embodiment of the invention.
Figure 2:
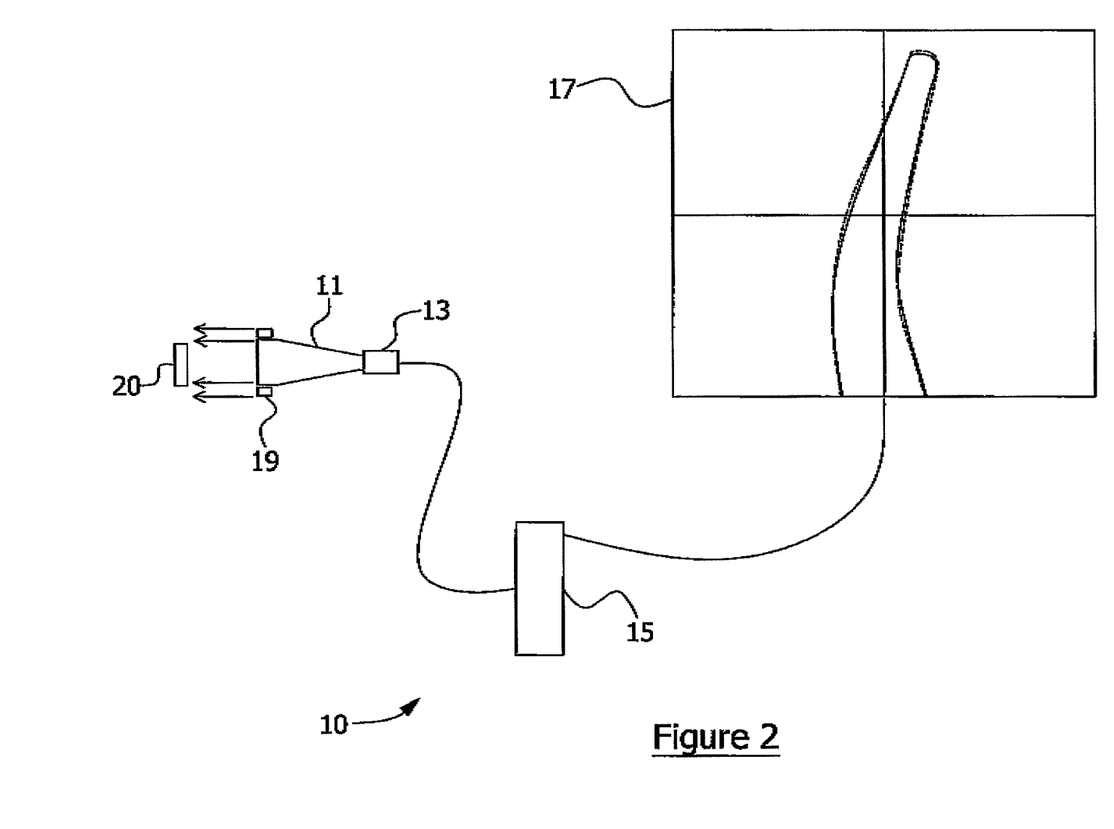
FIG. 2 is a schematic representation of a digital optical comparator system according to another preferred embodiment of the invention, where both the light source and the camera are on the same side of the part.
Figure 3:
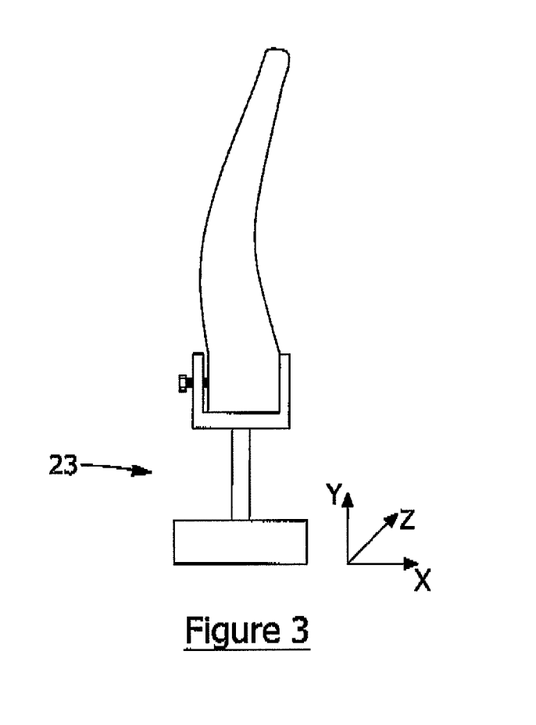
FIG. 3 is a schematic representation of a holder for the part.
Figure 4:
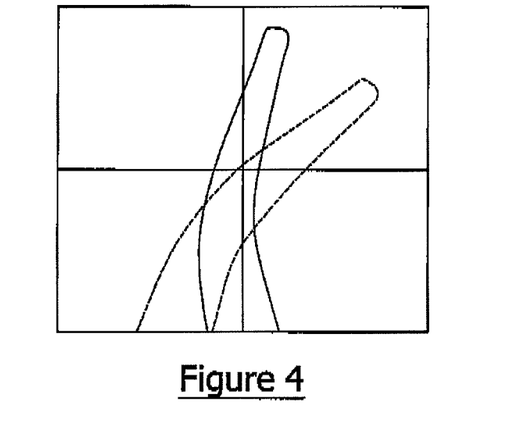
FIG. 4 is a view of the part displayed on multiple displays, with the drawing superimposed thereon, but in a non-oriented position.
Figure 5:
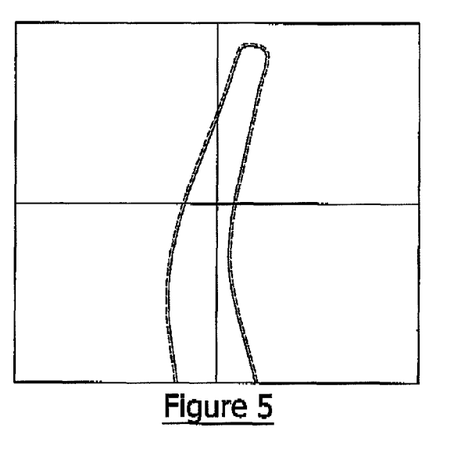
FIG. 5 is a view of the part displayed on multiple displays, with the drawing superimposed and aligned with the image of the part.

The DOC can also include a stage 23, either manual or motorized, to move the part in front of the camera. When the stage is encoded the DOC is able to carry out measurements beyond the optical field of view, by relating the stage displacements and the on-screen position of features between measurement points.

Other Capabilities

The DOC can call-up a part's drawing simply by either scanning in a barcode (which might correspond to a work order, for example) or by manually typing in the barcode information (in our example: typing-in the work order number).

The DOC also has the ability to recall a previously-displayed CAD drawing (as well as the position and orientation at which it was displayed) by clicking on a single on-screen button.

Optical Distortion Correction

Optical aberrations are due to the departures from the idealized conditions of Gaussian optics.

There are two main types of optical aberrations: chromatic and monochromatic aberrations. Chromatic aberrations are related to the different wavelengths in light, whereas monochromatic aberrations occur even if the light is highly monochromatic.

Distortion is one of the five primary monochromatic aberrations that stem from the differences between first-order and third-order paraxial theory. The other four are:
spherical aberration
comatic aberration (or coma)
astigmatism and
field curvature Spherical aberration, coma and astigmatism deteriorate the image and make it unclear, whereas field curvature and distortion deform the image.

Optical distortion occurs when the transverse magnification of a lens is not constant, and varies as a function of the off-axis image distance. If the magnification increases with the off-axis distance, then each point is displaced radially outward from the center of the image, with the most distant points moving the greatest amount. This is knows as positive or pincushion distortion. Similarly, negative or barrel distortion corresponds to the situation where the magnification decreases with the axial distance and in effect each point on the image moves radially inward toward the center.

A Mathematical Model of Optical Distortion

In the case of a rotationally symmetric optical system, radial distortion can be approximated by the following equation:

$$x' = x(1+k|x|^2) \qquad (1)$$

Where:
x is the undistorted position (measured radially)
x' is the distorted position (measured radially)
k is a constant that depends on the properties of the lens.
k is the coefficient of distortion. Clearly, k=0 corresponds to a situation where there is no distortion and positive and negative values for k results in positive and negative distortion, respectively.

Determining the Distortion Coefficient

Single-Sided Method

[One method to determine a lens' distortion coefficient involves imaging a standard with three aligned fiducials. The first fiducial is placed exactly in the center of the camera's field-of-view. The spacing between the fiducials, d, is constant. These conditions are shown below.

Note that standard meeting these requirements are quite common. A stage micrometer, for example, could be used.

Under these conditions, equation (1) can be written as follows:

$$X'_d = d(1+k|d|^2)$$

$$X'_{2d} = 2d(1+k|2d|^2)$$

In these equations, the subscripts d and 2d refer to the fiducials at positions d and 2d away from the center of the optical centerline, respectively.

Note that in equations (2a) and (2b) the terms $x_d'$ and $x_{2d}'$ are known (i.e. they can be measured by the imaging system), whereas d and k are unknown. Of course, d is arbitrary and of no interest and our objective here then is to obtain k.

Also, note that throughout this entire document, positions and distances are always expressed in pixels.

Equations (2a) and (2b) can be written as follows:

$$X'_d = d + kd^3$$

$$X'_{2d} = 2d + 8kd^3$$

And isolating k in both of these, we obtain:

$$k = \frac{x'_d - d}{d^3}$$

$$k = \frac{x'_{2d} - 2d}{8d^3}$$

These two equations can then be combined to produce $$\frac{x'_d - d}{d^3} = \frac{x'_{2d} - 2d}{8d^3}$$

Which can be solved for d as follows:

$$d = \frac{4}{3}x'_d - \frac{1}{6}x'_{2d}$$

d can then be substituted in order to obtain k.

Double-Sided Method

A second method involves using five evenly spaced fiducials, as shown in the following image.

With this approach, we align the middle fiducial as much as possible with the center of the image. We then measure the distance between the two "inner" fiducials, which we will refer to as $x'_{inner}$, and the distance between the two "outer" fiducials, which we will call $x'_{outer}$.

Under these conditions, equation (1) can be written as follows:

$$X'_{inner} = 2d(1+k|d|^2)$$

$$X'_{outer} = 4d(1+k|2d|^2)$$

Equations and can then be written as follows:

$$X'_{inner} = 2d + 2kd^3$$

$$X'_{outer} = 4d + 16kd^3$$

And isolating k in both of these, we obtain:

$$k = \frac{x'_{inner} - 2d}{2d^3}$$

$$k = \frac{x'_{outer} - 4d}{16d^3}$$

which can then be combined to produce $$\frac{x'_{inner} - 2d}{2d^3} = \frac{x'_{outer} - 4d}{16d^3}$$

Which can be solved for d as follows:

$$d = \frac{2}{3}x'_{inner} - \frac{1}{12}x'_{outer}$$

d can then be substituted to obtain k.

It can be shown that the double-sided method is twice as accurate as the single-sided method. The double-sided method should thus always be retained whenever practical.

The reader will appreciate that with both the single-sided and double-sided methods, all measurements should always be carried out from fiducial to fiducial, never from the system's optical centerline. This virtually eliminates any error due to small misalignments between the artifact and the optical centerline.

Practical Implementation

Implementing automatic distortion correction requires a calibration procedure as well as a fast implementation of equation (1).

Calibration Procedure

A semi-automated distortion calibration procedure is contemplated by the present invention, based on the double-sided method described above.

During the calibration operation, a crosshair will be displayed, to allow for alignment of the artifact under the optics (i.e. to align the artifact with the center of the field-of-view and to "square up" the artifact with the field-of-view.

The end result of the calibration procedure is the coefficient of distortion k.

Carrying Out the Distortion Correction "on the Fly"

With the k coefficient of distortion known, we can carry out a pre-processing operation to determine the "source" coordinates for every pixel in the image.

Specifically, this means that we need to solve (1) (which we re-write below for convenience) for x', with x and k known.

$$x' = x(1+k|x|^2)$$

In the general case, of course, x' will not be an exact integer value. This means that it falls somewhere between pixels, rather than exactly on one.

We must then carry out interpolation (of a chosen order) to obtain a "correspondence matrix" (i.e. information at pixel (i,j) should be taken from this location, according to that equation) that can be implemented practically.

Nearest-Neighbor Interpolation

For example, we can carry out nearest-neighbor interpolation (i.e. $0^{th}$ order interpolation), in which case the correspondence matrix is the simplest (i.e. information at pixel (i,j) should be taken directly from pixel (k, l)).

Nearest-neighbor interpolation is a very fast operation; however it produces a resulting image with "blocky" artifacts. It can be shown that nearest-neighbor interpolation can result in a spatial offset error up to $\frac{1}{2}^{1/2}$ pixel units.

Bilinear Interpolation

Bilinear interpolation (i.e. $1^{st}$ order interpolation) usually produces better results, for an extra computational cost.

The general equation for bilinear interpolation is $$v(x,y) = ax + by + cxy + d$$

Where:

v(x,y) is the interpolated value at position (x,y)

a, b, c and d are coefficients

Note that in this form of the bilinear equation:

$$0 <= x <= 1$$

$$0 <= y <= 1$$

Using the known information v(0,0), v(0,1), v(1,0) and v(1,1), the four coefficients of can be expressed as follows:

$$a = v(1,0) - v(0,0)$$

$$b = v(0,1) - v(0,0)$$

$$c = v(1,1) - v(1,0) + v(0,0) - v(0,1)$$

$$d = v(0,0)$$

In the case of bilinear interpolation, the correspondence matrix can be implemented by keeping, for every pixel, the four "corner" coordinates (i.e. coordinates (0,0), (0,1), (1,0) and (1,1) in equation (13)) as well as the x and y values used to solve equation. This information can then be used to solve the equations in real time.

Note that for a color image, all three color channels must be interpolated in this way. This is true for both nearest-neighbor and bilinear interpolation.

Finally, note that other higher-order interpolation schemes are also available and can, in many cases, produce better results. However, the computational cost is generally much higher. Bilinear interpolation is generally regarded as a very good compromise.

Defective Pixels

In the context of the present invention, defective pixels are pixels on a camera's CCD sensor that do not perform as they should. Defective pixels can affect both CCD and CMOS sensors, although in Applicant's experience they are much more prevalent in CMOS sensors, especially those with a very high resolution.

Defective pixels can also occur on LCD monitors. Whereas in camera sensors defective pixels fail to sense light levels correctly, in the case of LCD monitors defective pixels fail to produce the correct light levels.

The ISO 9002 13406-2 standard, specifically for LCD screens, distinguishes between three different types of defective pixel:

1. Hot pixels (always on)
2. Dead pixels (always off)
3. Stuck pixels (one or two sub-pixels are always on or always off)

Still according to the ISO 9002 13406-2 standard:

Hot pixels are usually best seen against a dark background. A permanently lit white pixel, called a glowing pixel, is a special case of a hot pixel.

A dead pixel is a defective pixel that remains unlit. Dead pixels are usually best seen against a white background.

A stuck pixel will usually be most visible against a black background, where it will appear red, green, blue, cyan, magenta, or yellow, although stuck red, green, or blue pixels are most common. Each pixel on an LCD monitor is composed of three sub pixels (one red, one green, and one blue) which produce the visible color of the pixel by their relative brightness. A stuck pixel in an LCM monitor results from a manufacturing defect, which leaves one or more of these sub-pixels permanently turned on or off.

Defective pixels in LCD screens can sometimes be improved by mechanically manipulating the area around a defective pixel by pressing or tapping. This can help to evenly distribute the oil inside the screen, but it can also damage it.

Stuck pixels are not guaranteed to be correctable, and can remain faulty for the life of the monitor, however might be fixed by flashing numerous colors with a very rapid intensity.

Stuck pixels are often incorrectly referred to as dead pixels, which have a similar appearance. In a dead pixel, all three sub-pixels are permanently off, producing a permanently black pixel. Dead pixels can result from similar manufacturing anomalies as stuck pixels, but may also occur from a non-functioning transistor resulting in complete lack of power to the pixel. Dead pixels are much less likely to correct themselves over time or be repaired through any of several popular methods.

Stuck pixels, unlike dead pixels, have been reported to disappear, and there are several popular methods purported to fix them, such as gently rubbing the screen (in an attempt to reset the pixel), cycling the color value of the stuck pixel rapidly (in other words, flashing bright colors on the screen), or simply tolerating the stuck pixel until it disappears (which can take anywhere from a day to years). While these methods can work on some stuck pixels others cannot be fixed by the above methods. Also some stuck pixels will reappear after being fixed if the screen is left off for several hours.

The above information applies to defective pixels in LCD monitors. In the case of defective pixels in camera sensors, of interest in the context of the present invention, the term dead pixels is generally applied to encompass all types of defective pixels. Furthermore, and still in the context of camera sensors, true "stuck pixels" that meet the ISO 9002 13406-2 standard definition only exist for 3-CCD cameras, which are much less widespread than single sensor cameras. In the case of single sensor cameras, color is most often obtained via a Bayer filter and there are thus no sub pixels to speak of.

Keeping to the case of camera sensors, true "dead pixels" and "hot pixels" as defined in the ISO 9002 13406-2 standard (i.e. pixels that are always off and always on) appear to be much less prevalent than "partially on" (i.e. pixels that are neither fully on nor fully off). Note that because of the Bayer filter effect, these "partially on" pixels have a distinct color in single sensor color cameras. It is not clear if the intensity of these "partially on" pixels can sometimes change over time. What is clear is that over reasonably short periods of time (i.e. hours) their intensity—for a given scene intensity—remains unchanged. However, if the scene intensity changes significantly, the intensity of these "partially on" pixels can change. Our hypothesis to explain this is a form of "spillover" from neighboring pixels.

To summarize all of the above: in the case of camera sensors, we use the term dead pixels to describe all defective pixels, and the most common type of defective pixels are those that remain partially on.

Defective Pixel Detection

Different approaches to detect defective pixels in an image are possible. The one that has produced fast, accurate and reliable results for the Applicant, and that has been selected involves analyzing an image that should be completely black.

This approach requires asking the user to supply an image where absolutely no light reaches the camera's sensor. The system then looks at all of the pixels in a user-specified Region Of Interest (ROI) and locates all of the pixels that have at least one channel (i.e. R, G, B) value above a user-specified threshold. Note that the ROI can of course also be set to correspond to the entire image.

In the case of a 24 bit per pixel image (i.e. 8 bits each for the R, G and B channels) the possible threshold values range from 0 to 255.

Depending on the specifics of the camera, the threshold value can vary quite a bit. Also, it can depend on some of the camera settings (e.g. gain, exposure, and others, depending on the specific settings available for the camera). Care should thus be used when selecting the threshold value. There is generally a sharp "break" in the relationship between the number of affected pixels and the threshold value (i.e. the number of affected pixels increases tremendously—possibly going all the way to 100% of the pixels—if you select a threshold value below this inflection point). The optimal value will thus be the one just above this inflection point. Generally, a user's eye will easily and intuitively tell the user if defective pixel correction is required and after a few quick "trial and errors", a good $1^{st}$ approximation of what the threshold value should be.

Defective Pixel Correction Scheme

The approach described above can be used to detect defective pixels. A flag (indicating whether the pixel is "defective" or not) can then be set and kept in an ordered vector, for every pixel.

Note that this vector can be saved to disk and carried over from session to session. Proceeding in this way, it is only necessary in theory to carry out defective pixel correction one, on system commissioning.

With this vector of "flags", defective pixel correction can be carried out on every image coming from the camera. To do this, a defective pixel correction procedure should be introduced far upstream in the "image capture" pipeline. In fact, this procedure should immediately follow the image capture operation proper (it should certainly be before any distortion correction or similar procedure).

The defective pixel correction procedure should consider every pixel in the ROI and for every pixel (i,j) with a flag indicating that the pixel if "defective", the following localized (i.e. pixel-specific) correction should be carried out:

$$R(i,j)=(R(i-1,j)+R(i+1,j)+R(i,j-1)+R(i,j+1))/4$$

$$G(i,j)=(G(i-1,j)+G(i+1,j)+G(i,j-1)+G(i,j+1))/4$$

$$R(i,j)=(B(i-1,j)+B(i+1,j)+B(i,j-1)+B(i,j+1))/4$$

It should be understood that the above 4-neighbor correction scheme should be modified appropriately if one or two neighboring pixels are not available (such as would be the case for the pixels on the edge of the image, for example). Also, neighboring pixels that themselves need to be corrected should not be used to carry out defective pixel correction and the above equation should be modified accordingly.

Note that it is also possible to consider a 9-neighbor correction scheme (or even wide, for that matter). In this case, the use of appropriate (i.e. distance-weighted) interpolation coefficients would be recommended.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A digital optical comparator, comprising:
    a holder for holding a part, wherein said part is mounted on a moveable carriage;
    a light source for illuminating the part;
    a camera for capturing an image of the illuminated part and a lens placed in front of said camera; and
    a data processing system for receiving the image, for determining a position and orientation of said part, for obtaining a CAD drawing of said part, for displaying said image and said CAD drawing on a computer screen, and for digitally overlaying said CAD drawing on said image, said data processing system including means for aligning said CAD drawing with said image by translating and rotating said CAD drawing to line up the edges of the part in the CAD drawing with the edges of the part in the image to permit comparison of said part with said CAD drawing, wherein said means for aligning said drawing with said image automatically translates and rotates the CAD drawing to the part by minimizing the least squares distance between control points on said CAD drawing and the corresponding points on said part in said image; said data processing system displays tolerances for said part so that a determination whether said part is manufactured within tolerances can be visually made; and the movement of said part on said moveable carriage is tracked based on the displacement of said moveable carriage, thus enabling the comparison of the part to the CAD drawing beyond the system's optical field-of-view, across the entire travel of said moveable carriage.

2. A digital optical comparator according to claim 1, wherein said comparator further includes an image enhancement module.

3. A digital optical comparator according to claim 1, wherein said means for aligning said drawing with said image include a pattern matching subsystem.

4. A digital optical comparator according to claim 1, wherein said computer screen includes a plurality of screens, so that said image is displayed in 1:1 resolution.

5. A digital optical comparator according to claim 1, wherein said data processing system is a general purpose computer.

6. A digital optical comparator according to claim 1, wherein said comparator further includes a defective pixel corrector.

7. A digital optical comparator according to claim 1, wherein determination of whether said part is manufactured within tolerances is made without measuring said part.

8. A digital optical comparator according to claim 1, wherein said data processing system further includes a measurement package for enabling on-screen measurements.

9. A digital optical comparator according to claim 1, wherein said camera provides a streaming video signal to said data processing apparatus.

10. A method for permitting comparison between a part under study and a reference CAD drawing containing specifications for said part, said method comprising:
    (a) placing said part on a moveable carriage;
    (b) illuminating said part;
    (c) capturing an image of said part with a camera, said camera being provided with a lens;
    (d) overlaying said drawing and said image of said part on a display;
    (e) translating and rotating said drawing to align the edges of the part in the drawing with the edges of the part in the image, wherein said aligning said drawing with said image automatically translates and rotates the CAD drawing to the part by minimizing the least squares distance between control points on said CAD drawing and the corresponding points on said part in said image;
    (f) tracking a movement of said part based on a displacement of said moveable carriage, enabling comparison of the part to the CAD drawing beyond the field-of-view of said system, across the entire travel of said moveable carriage;
    (g) displaying tolerances for said part; and
    (h) visually determining whether said part is manufactured within tolerances.

11. A method according to claim 10, wherein said method further includes the step of correcting said image with an image correction module prior to displaying said image on said display.

12. A method according to claim 10, wherein said method further includes the step of enhancing said image with an image enhancement module prior to displaying said image on said display.

13. A method according to claim 10, wherein said step of aligning said part with said drawing is manual or automatic.

14. A method according to claim 10, wherein said method further includes the step of correcting a distortion introduced by said lens with a distortion correction module.

15. A method according to claim 10, further comprising the step of providing a measurement module in order to enable on-screen measurements of said part.

16. A digital optical comparator according to claim 1, wherein said comparator includes an image distortion correction module.

* * * * *